June 26, 1928.

L. T. LEET 1,675,222

LIQUID VENDING MACHINE

Filed Dec. 7, 1925  2 Sheets-Sheet 1

INVENTOR
LYNN T. LEET
BY Fetherstonhaugh & Co.
ATTORNEYS

June 26, 1928.

L. T. LEET

LIQUID VENDING MACHINE

Filed Dec. 7, 1925

INVENTOR
LYNN T. LEET
BY Fetherstonhaugh & Co.
ATTORNEYS

Patented June 26, 1928.

1,675,222

UNITED STATES PATENT OFFICE.

LYNN T. LEET, OF MONTREAL, QUEBEC, CANADA.

LIQUID-VENDING MACHINE.

Application filed December 7, 1925. Serial No. 73,857.

This invention relates to new and useful improvements in liquid vending machines and particularly to machines in which the liquid is served in a cold state and the object of the invention is to provide a machine of the class stated in which the refrigerant will be stored in the liquid reservoir in such a manner that the liquid will be materially improved as regards taste and odour.

Another object is to provide a machine of the class stated in which liquid will be fed from the reservoir without the operation of valves or such like mechanism.

A still further object is to provide a reservoir for a liquid vending machine in which the carbonic acid gas given off by the refrigerant will mix with the liquid in the reservoir to aerate same.

A still further object is to provide a simple machine of the class stated which will be efficient in operation and easy to open for refilling, cleaning and the like.

In my invention, I provide a liquid vending machine having a reservoir, the upper end of which is provided with a removable sealing cover. The lower end of the reservoir is provided with a recess into which the liquid flows and is drawn therefrom by a bucket operated by any suitable mechanism. In the reservoir and positioned above the maximum level of the liquid therein, is a trough having a liquid trap for sealing the reservoir. The liquid is tipped into the trough, the overflow from which flows into a cup held in place below the outlet from the reservoir. Suitable brackets are provided in the reservoir for a block of solid, dry refrigerant which is positioned above the level of the trap.

In the drawings which illustrate one form of my invention:—

Figure 1:
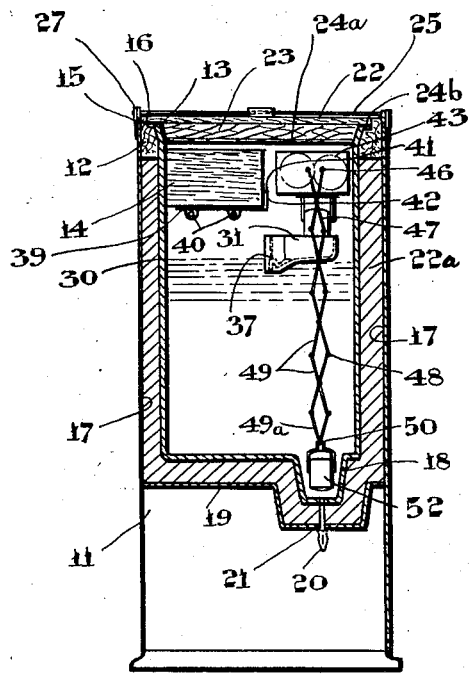
Figure 1 is a sectional front elevation of the liquid reservoir with the vending mechanism shown diagrammatically.
Figure 2:
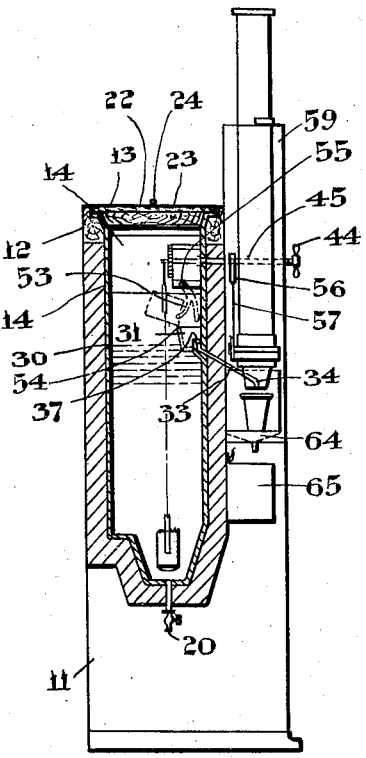
Figure 2 is a sectional side elevation of the device shown in Figure 1.
Figure 3:
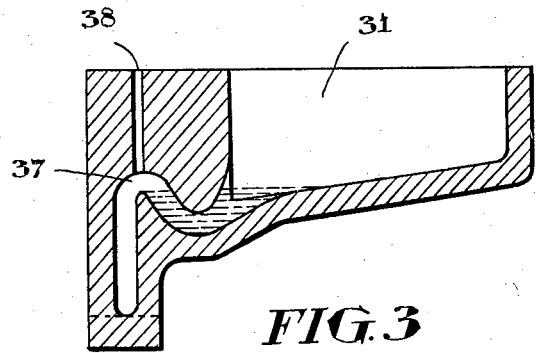
Figure 3 is an enlarged sectional elevation of the trough and liquid trap therefor.
Figure 7:
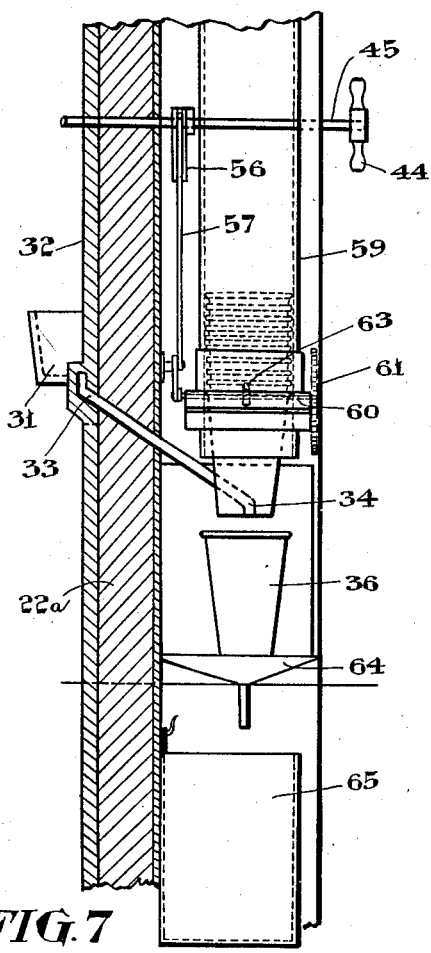
Figure 7 is an enlarged sectional side elevation of the machine showing the mechanism detailed in Figure 6.
Figure 6:
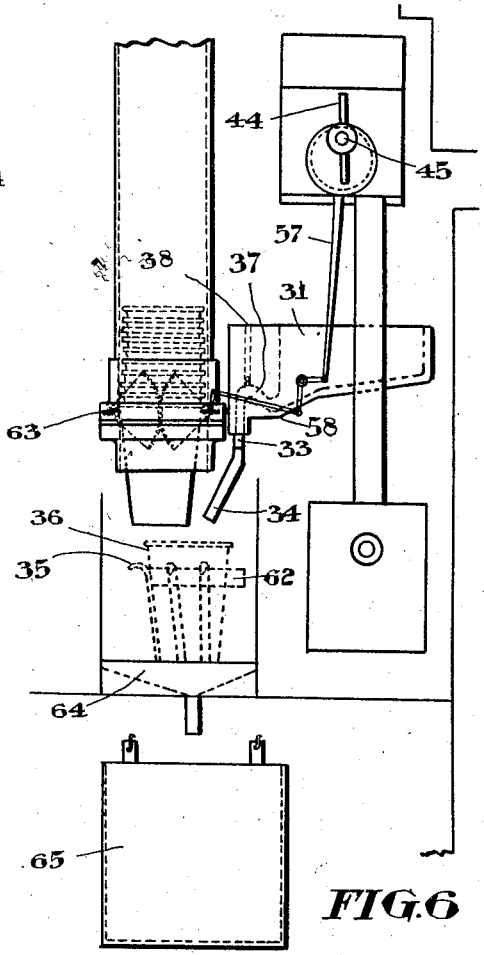
Figure 6 is an enlarged front elevation showing one form of cup vending mechanism, showing the relationship between it and the outlet from the reservoir.
Figure 4:
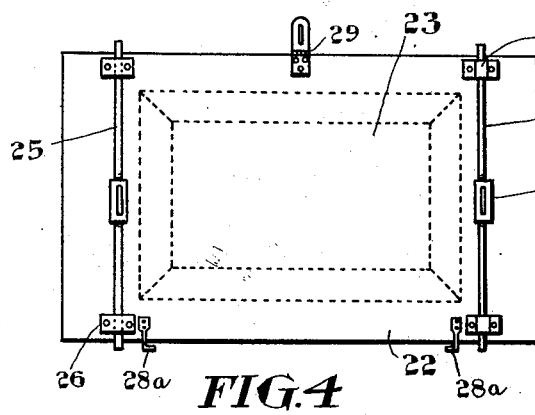
Figure 4 is a plan view of the reservoir cover.
Figure 5:
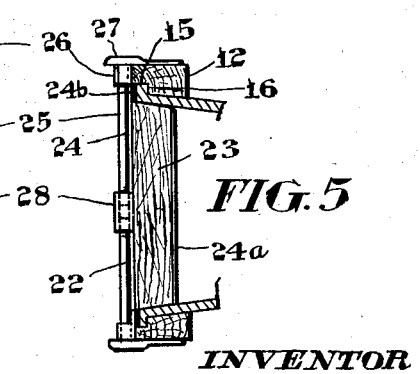
Figure 5 is a side sectional elevation of the cover.

Referring more particularly to the drawings, 11 designates a stand, the upper or open end of which has a rail or support 12 tapered on its inner side to receive the flaring end 13 of a reservoir 14, the uppermost edge 15 of which may be flanged to fit into a recess 16 formed in the rails. The reservoir may be of rectangular formation, as shown and is spaced from the inner surface 17 of the walls of the stand. The lower end of the reservoir is provided with a recess or well 18. Spaced from the lower end of the reservoir is the lining 19 and a drain cock 20 extending from the well passes through an aperture 21 formed therein, so that the well may be drained without interfering with the lining. In the space between the outer wall of the reservoir and the stand and lining, insulating material $22^a$, such as cork may be placed to keep the liquid within the reservoir from being seriously affected by the temperature of the atmosphere surrounding the stand. Fitting over the flanged end of the reservoir and upper edge of the stand and also into the flaring end of the reservoir is the cover 22. This cover consists of a central core 23 of wood, secured to a thin metal sheet 24, on the top and having a metal sheet $24^a$ secured to its lower side. The cover fits closely against the upper ends of the reservoir and tank and a gasket $24^b$ is placed between them to form a seal. To make doubly sure that no gas escapes therethrough, locking bolts 25 are provided. These bolts are mounted in brackets 26, secured to the cover and moved in and out of engagement with apertured lugs 27, secured to the case or stand. By means of the turnbuckles 28 joining the adjacent ends of the bolts which are oppositely screw threaded, the cover may be locked to the case by moving or turning the turnbuckle in one direction and unlocked by moving it in the opposite direction. The cover may be attached to the stand by means of the hinges $28^a$ and a hasp and staple locking means 29 may be fitted to the cover and the casing to lock them together. The maximum level to which liquid placed in the reservoir may attain is indicated by the line 30. A trough 31 is fitted to the side 32 of the reservoir, the upper edge of said trough being positioned above the level of the line 30. This trough has an outlet 33 which leads into the discharge tube 34, the end of which is positioned above the centre of a cup holder 35 in such a manner that the liquid flowing from the end of the tube will fill a cup 36 held below it by means of the holder. A liquid trap is formed in the trough outlet by forming the part 37 adjacent the main body of the trough in the form of a U. An air vent 38 may be formed in the trap at the highest point thereof, namely above the line leading directly to the outlet. This vent places the part 36 in communication with the atmosphere through an opening in the side of the reservoir. A bracket 39 may be provided for the refrigerant and may consist of a pair of bolts 40 and a strap 41. The refrigerant which is of the solid dry type, known generally as dry ice, rests on the bolts and between the sides of the reservoir and the end 42 of the strap. This dry refrigerant does not melt but evaporates in the form of a gas of very low temperature and is much heavier than air and falls towards the liquid thereby causing the same to assume a very low temperature. Positioned vertically above the well 18 are the toothed wheels 43 gearing with one another, and adapted to move in unison on the movement of the handle 44, which is attached to or made integral with the spindle 45, supporting one of the wheels. Pivotally secured to pins 46, projecting outwardly from one face or side of each of the wheels are the links 47 which are pivotally secured at their centres 48. A plurality of similarly attached double links 49 are secured to the free ends of the links 47. The end links 49ª are secured to the free ends of the last pair of links 49 at one end and to each other at their other end 50. A bale 51 is secured to the end 50 and pivotally secured to the bale is a bucket 52. On moving the wheels 43 through 180° the links are drawn upwardly, pulling the bucket with them until it contacts with a tipping pawl 53 projecting beyond the edge 54 of the trough and tips the liquid contained therein into the trough. The pawl may be pivotally attached to a bracket 55, secured to the wall of the reservoir. On a further rotation of 180° of the wheels 43, the link bracket supporting the bucket expands and drives the empty bucket into the well 18. Attached to the spindle 45 is the eccentric 56 which operates a connecting rod 57 adapted to operate a cup vending machine secured in any suitable manner to the stand. The cups are stored in an enclosed column 59, with the lowermost cup resting on toothed sprockets 63, secured to spindles 60, connected by quadrants 61, so that they rotate towards one another and allow one cup at a time to drop on to a receiver arm 62. One of the spindles 60 is connected to the connecting rod 57 by means of the lever 58. The cup as it drops from engagement with the sprocket 63 is guided by any suitable means, not shown, so that it will be positioned directly below the outlet from the reservoir. A suitable drain pan 64 may be positioned below the cup and may be provided with an outlet communicating with a drip can 65 secured by hooks to part of the framing surrounding the reservoir.

Modifications may be made in the construction of the various parts of the mechanism herein described, without departing from the spirit of my invention.

In operation the reservoir is filled to its capacity, the solid dry refrigerant placed in its supports and the vessel or reservoir sealed by placing the cover thereon, screwing the locking bolts, so that they engage with the lugs on the side of the frame and locking the cover in position by means of the hasp locking mechanism. The cork or such like insulation tends to keep the changing temperature outside of the casing from affecting the liquid contained in the reservoir. The solid dry refrigerant keeps the liquid at the desired low temperature without affecting the taste of the liquid as it is practically odourless and evaporates in the form of a gas of very low temperature, the gas mixing with the liquid to aerate same. On turning the handle through 180° the bucket is lowered into the well and a cup released from the cup reservoir so that it falls directly below the outlet from the reservoir. On a further rotation of 180° of the handle, the bucket is raised full of liquid and tipped into the trough, the outlet from which leads to the cup. The trap in the trough outlet keeps the air from the outside from passing into the reservoir in volume and the air vent allows an even balance of the pressure in the reservoir, and also keeps the trap full of liquid by preventing any siphoning action of the liquid being discharged from affecting the trap. This air vent is too small to permit escape of any considerable volume of gas and by preventing the siphoning action of the discharge liquid from clearing the trap insures a sufficient amount of sealing liquid in the trap to retain a considerable volume of the gas within the reservoir.

Having thus described my invention, what I claim is:—

In a liquid vending apparatus the combination of a hermetically sealed container adapted to be partly filled with liquid, a trough mounted in the container, said trough being open at the top and positioned with the upper edge thereof in a plane above the level of the liquid, means for delivering liquid from the container to said trough, an outlet leading from the trough through the wall of the container, said container being adapted to hold a solid, dry refrigerating substance mounted in the container above the level of the liquid and adapted, on absorption of heat, to pass from the solid to the gaseous state, and a trap formed in the outlet from the reservoir to retain a portion of the liquid delivered to the trough to form a liquid seal.

In witness whereof, I have hereunto set my hand.

LYNN T. LEET.